(12) United States Patent
Bredehoeft et al.

(10) Patent No.: US 10,838,980 B2
(45) Date of Patent: Nov. 17, 2020

(54) ASYNCHRONOUS COLLECTOR OBJECTS

(71) Applicant: SAP SE, Walldorf (DE)

(72) Inventors: Antje Bredehoeft, Malsch (DE); Hagen Eck, Heidelberg (DE); Ralf Philipp, Altlussheim (DE); Wilko Dann, Ketsch (DE); Ralf Missal, Lampertheim (DE)

(73) Assignee: SAP SE, Walldorf (DE)

( * ) Notice: Subject to any disclaimer, the term of this patent is extended or adjusted under 35 U.S.C. 154(b) by 190 days.

(21) Appl. No.: 16/043,009

(22) Filed: Jul. 23, 2018

(65) Prior Publication Data

US 2020/0026793 A1   Jan. 23, 2020

(51) Int. Cl.
| | | |
|---|---|---|
| *G06F 16/27* | (2019.01) | |
| *G06F 16/22* | (2019.01) | |
| *G06F 16/23* | (2019.01) | |

(52) U.S. Cl.
CPC ........ *G06F 16/273* (2019.01); *G06F 16/2228* (2019.01); *G06F 16/2379* (2019.01)

(58) Field of Classification Search
CPC ........ G06F 16/20; G06F 16/27; G06F 16/258; G06F 16/2228; G06F 16/2379; G06F 16/2477; G06F 16/273
USPC .................................................. 707/610, 613
See application file for complete search history.

(56) References Cited

U.S. PATENT DOCUMENTS

| | | | | |
|---|---|---|---|---|
| 7,197,398 | B2* | 3/2007 | Azari | E21B 49/08 702/13 |
| 10,333,724 | B2* | 6/2019 | Piro, Jr. | G05F 1/561 |
| 2002/0194203 | A1* | 12/2002 | Mosher, Jr. | G06F 11/2094 |
| 2009/0228446 | A1* | 9/2009 | Anzai | G06F 16/284 |
| 2012/0192701 | A1* | 8/2012 | Watanabe | G10H 1/40 84/622 |
| 2014/0280251 | A1* | 9/2014 | Somekh | G06F 16/9535 707/754 |
| 2015/0019323 | A1* | 1/2015 | Goldberg | G06Q 30/0242 705/14.41 |
| 2015/0058822 | A1* | 2/2015 | Elias | G06F 8/75 717/123 |
| 2015/0282074 | A1* | 10/2015 | Szabo | H04L 47/127 370/311 |

* cited by examiner

*Primary Examiner* — James Trujillo
*Assistant Examiner* — Fariborz Khoshnoodi
(74) *Attorney, Agent, or Firm* — Mints Levin Cohn Ferris Glovsky and Popeo, P.C.

(57) ABSTRACT

A method may include generating, for a first time period having a first length, an instance of a collector object. The collector object may be configured to collect values over time periods having the first length. The instance of the collector object may be updated based on one or more values from a first record. The first record may store values collected over a second time period having a second length. A valuation operation may be performed based at least on the first instance of the collector object. The performance of the valuation operation may require values spanning at least one time period having the first length. Related systems and articles of manufacture, including computer program products, are also provided.

20 Claims, 9 Drawing Sheets

Time Information for Jean-Pierre Moulin

| TIME RECORDS | TIME ACCOUNTS | WORK SCHEDULE | TIME ALERTS | | TIME COLLECTORS | | |
|---|---|---|---|---|---|---|---|
| Collector Name | Collector Periodicity | Valid From | Valid To | Collector Value | Last Posting Value | Last Posting Date |
| LATE_SHIFTS_PER_MON... | MONTHLY | Jun 1, 2018 | Jun 30, 2018 | 8 | 1 | Jun 23, 2018 |
| LATE_SHIFTS_PER_MON... | MONTHLY | Jun 1, 2018 | Jun 30, 2018 | 7 | 3 | Jun 16, 2018 |
| LATE_SHIFTS_PER_MON... | MONTHLY | Jun 1, 2018 | Jun 30, 2018 | 4 | 3 | Jun 9, 2018 |
| LATE_SHIFTS_PER_MON... | MONTHLY | Jun 1, 2018 | Jun 30, 2018 | 1 | 1 | Jun 2, 2018 |
| LATE_SHIFTS_PER_MON... | MONTHLY | May 1, 2018 | May 31, 2018 | 14 | 2 | May 31, 2018 |
| LATE_SHIFTS_PER_MON... | MONTHLY | May 1, 2018 | May 31, 2018 | 12 | 3 | May 26, 2018 |
| LATE_SHIFTS_PER_MON... | MONTHLY | May 1, 2018 | May 31, 2018 | 9 | 3 | May 19, 2018 |
| LATE_SHIFTS_PER_MON... | MONTHLY | May 1, 2018 | May 31, 2018 | 6 | 3 | May 12, 2018 |
| LATE_SHIFTS_PER_MON... | MONTHLY | May 1, 2018 | May 31, 2018 | 3 | 3 | May 5, 2018 |
| LATE_SHIFTS_PER_MON... | MONTHLY | Apr 1, 2018 | Apr 30, 2018 | 0 | 0 | Apr 30, 2018 |

Time Type Group: Late Shifts in a Month (LATE_SHIFTS_PER_MONTH) — 220

* External Name: Late Shifts in a Month 🌐 ⓘ
Valuation Result Category: No Selection ⓘ
Valuation Result Factor: ⓘ
* UI Component: No ⓘ
* Time Category: Counted Events ⓘ
* Time Pay Type: No ⓘ
Comment: ⓘ
* External Code: LATE_SHIFTS_PER_MONTH ⓘ
* Time Collector Type: Yes ⓘ
* Time Collector Periodicity: Monthly ⓘ

Time Type
No data for Time Type available or you do not have the necessary permission.

FIG. 2C

ASYNCHRONOUS COLLECTOR OBJECTS

TECHNICAL FIELD

The subject matter described herein relates generally to database processing and more specifically to asynchronous database collector objects.

BACKGROUND

A database may be configured to store a variety of data in the form of electronic data records. For example, a single data record may include one or more fields, each of which holding a value (e.g., an alphanumeric string value, an integer value, a floating-point value, a Boolean value, and/or the like). Individual data records may further be organized into various database objects including, for example, database tables, graphs, and/or the like. Data records stored in the database may be accessed via a database management system (DBMS) coupled with the database. For instance, the database management system may support a variety of operations for accessing the data records held in the database, including, for example, structure query language (SQL) statements, a graph query language statement, and/or the like.

SUMMARY

Systems, methods, and articles of manufacture, including computer program items, are provided for asynchronous data collection in a database. In one aspect, there is provided a system. The system may include at least one data processor and at least one memory. The at least one memory may store instructions that cause operations when executed by the at least one data processor. The operations may include: generating, for a first time period having a first length, a first instance of a collector object, the collector object being configured to collect values over time periods having the first length; updating, based at least on one or more values from a first record, the first instance of the collector object, the first record storing values collected over a second time period having a second length; and performing, based at least on the first instance of the collector object, a valuation operation, the performance of the valuation operation requiring values spanning at least one time period having the first length.

In some variations, one or more features disclosed herein including the following features can optionally be included in any feasible combination. The first instance of the collector object may be updated based at least on the one or more values exceeding a threshold value.

In some variations, the first instance of the collector object may be updated based at least on an outcome of a logical expression applied to the one or more values.

In some variations, the updating of the first instance of the collector object may include storing, in the first instance of the collector object, at least one value from the first record. The updating of the first instance of the collector object may further include updating, based on the at least one value, a cumulative value stored in the first instance of the collector object. The cumulative value may correspond to a quantity accrued over the first time period.

In some variations, a second instance of the collector object may be generated for a third time period having the first length. The first instance of the collector object and/or the second instance of the collector object may be updated based at least on one or more values from a second record. The second record may be configured to collect values over a fourth time period having the second length. The valuation operation may be performed further based at least on the second instance of the collector object.

In some variations, the first record may be stored in a database. In response to the first record being successfully stored in the database, the first instance of the collector object may be updated based on the one or more values from the first record. In response to the first record not being successfully stored in the database, the update made to the first instance of the collector object based on the one or more values from the first record may be undone. In response to detecting one or more changes to the first record stored in the database, the first instance of the collector object stored in the database may be updated based at least on the one or more changes to the first record.

In some variations, in response the valuation operation requiring values from the first instance of the collector object but not a second instance of the collector object, the valuation operation may be performed without persisting, in a database, the first instance of the collector object.

In some variations, the first record may be a timesheet storing time entries input over the second time period.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A depicts a screenshot of a user interface, in accordance with some example embodiments;

FIG. 2C depicts a screenshot of a user interface, in accordance with some example embodiments;

When practical, similar reference numbers denote similar structures, features, or elements.

DETAILED DESCRIPTION

Figure 1:
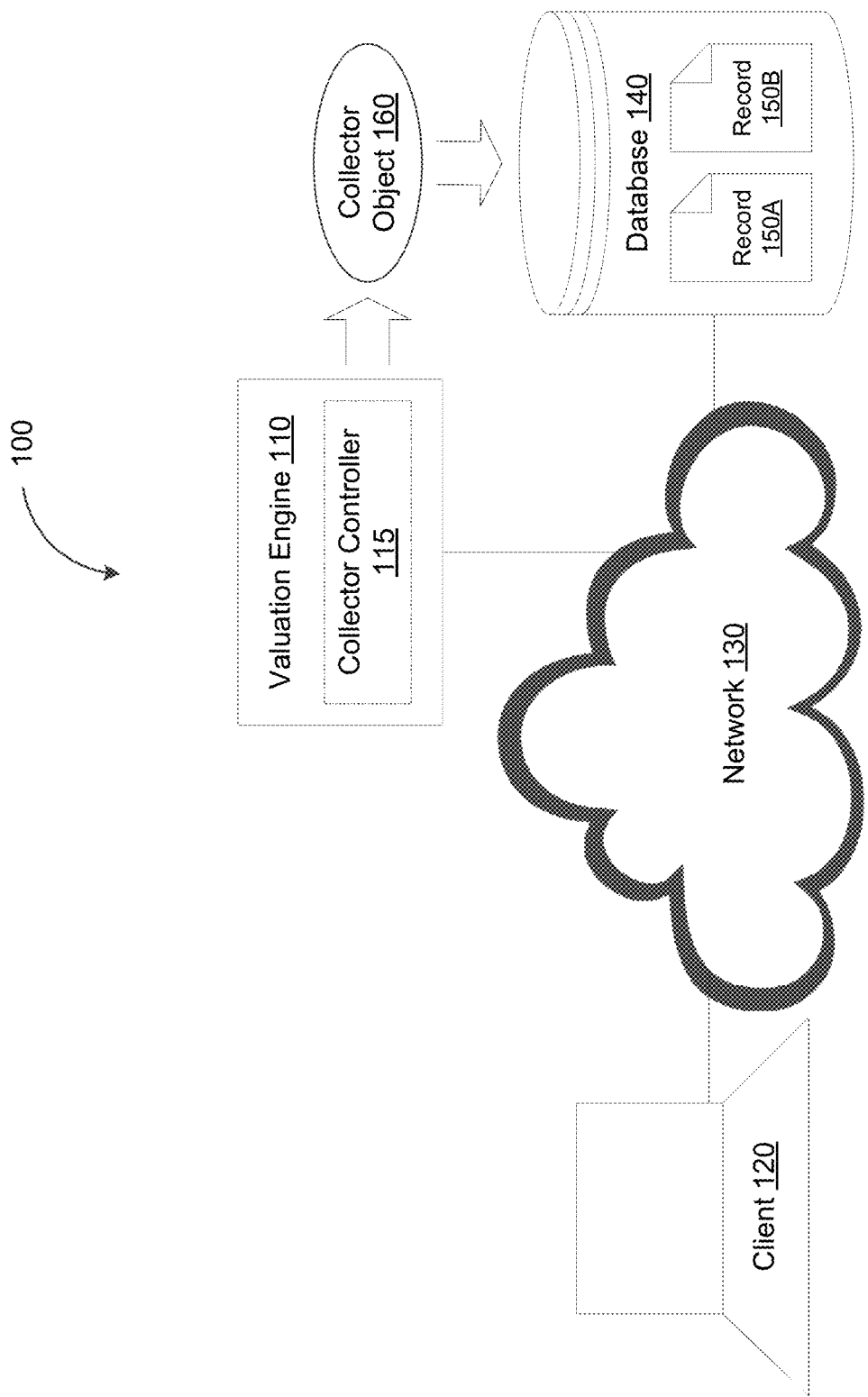
FIG. 1 depicts a system diagram illustrating a valuation system, in accordance with some example embodiments.

A database may store data that is generated at regular intervals. For example, the database may store one or more time records, each of which being a data structure storing one or more values that have accrued over a time period. As such, a time record may correspond to a timesheet tracking, for example, one or more quantities of time worked by an employee during a week. Furthermore, basic valuation operations such as, for example, determining a total quantity of time worked by an employee during a particular week, may be performed based on a corresponding time record. However, conventional time records do not support more complex valuation operations. In particular, conventional time records, which store quantities of time that have accrued over a specific time period, may not be used to perform valuation operations that span a different length time period. Accordingly, in some example embodiments, a valuation engine may deploy one or more collector objects configured to support complex valuation operations. For instance, instances of a collector object may be configured to collect values that accrue over a different length time period than the time records stored in the database. In doing so, the collector object may enable the performance of valuation operations spanning a different time period than the time period covered by the time records stored in the database FIG. 1 depicts a system diagram illustrating a valuation system 100, in accordance with some example embodiments. Referring to FIG. 1, the valuation system 100 may include a valuation engine 110 that is communicatively coupled with a client 120 and a database 140. It should be appreciated that the client 120 may be any type of processor and memory based device including, for example, a cellular phone, smart phone, a tablet, a laptop computer, a desktop, a workstation, and/or the like. Meanwhile, the network 130 may be any wired and/or wireless network including, for example, a public land mobile network (PLMN), a local area network (LAN), a wide area network (WAN), a virtual local area network (VLAN), the Internet, and/or the like. The database 140 may be any type of database including, for example, a graph database, an in-memory database, a relational database, a non-SQL (NoSQL) database, and/or the like.

The database 140 may store a plurality of records including, for example, a first record 150A, a second record 150B, and/or the like. The first record 150A and/or the second record 150B may be time records. As such, the first record 150A and/or the second record 150B may be data structures storing one or more values that have accrued over a time period. For example, the first record 150A and/or the second record 150B may be individual timesheets tracking, based on inputs (e.g., time entries and/or the like) received from the client 120, one or more quantities of time worked by an employee over a specific time period. The first record 150A may be a timesheet tracking the quantities of time worked by the employee during one week (e.g., Week A) while the second record may be another timesheet tracking the quantities of time worked by the employee during a different week (e.g., Week B). Accordingly, a basic valuation operation spanning a same length time period as the first record 150A and/or the second record 150B may be performed based on the first record 150A or the second record 150B. For instance, the valuation engine 110 may perform, based on the first record 150A, a basic valuation operation to determine the total quantity of time an employee worked during Week A. Alternatively and/or additionally, another basic valuation operation to determine the total quantity of time the employee worked during Week B may be performed based on the second record 150B.

In some example embodiments, the valuation engine 110 may perform complex valuation operations that span a different length time period than the records that are being generated and stored in the database 140 including, for example, the first record 150A and/or the second record 150B. For example, the first record 150A and/or the second record 150B may be timesheets that are generated based on inputs (e.g., time entries) input by the client 120. Meanwhile, a complex valuation operation may span a longer time period (e.g., a month, a year, and/or the like) and/or a shorter time period (e.g., fewer than seven days) than the first record 150A and/or the second record 150B. In order to support complex valuation operations, the valuation engine 110 may include a collector controller 115 configured to generate, update, and/or maintain one or more collector objects including, for example, a collector object 160. The collector object 160 may be a metadata framework (MDF) object, which may be created specifically for the client 120. Furthermore, the time period associated with the collector object 160 may be any length as configured by, for example, the client 120. As such, the collector object 160 may be configured to collect values over a longer time period and/or a shorter time period than the first record 150A and/or the second record 150B. For instance, while the first record 150A and/or the second record 150B may store values (e.g., quantities of time worked by an employee and/or the like) that accrued over a week, the collector object 160 may be configured to collect values on a daily basis, a weekly basis, a monthly basis, a quarterly basis, a yearly basis, and/or the like.

In some example embodiments, the collector object 160 may be configured to collect any type of value, for example, from the first record 150A and/or the second record 150B. For example, the collector object 160 may be configured track one or more quantities of time in any unit of time including, for example, minutes, hours, and/or the like. Accordingly, the collector object 160 may track one or more quantities of time (e.g., in minutes, hours, and/or the like)

worked by an employee over a time period (e.g., day, week, month, and/or the like) configured, for example, by the client 120. Alternatively and/or additionally, the collector object 160 may be configured to serve as counter that is incremented, for example, based on whether one or more values from the first record 150A and/or the second record 150B exceed a threshold value. For instance, the collector object 160 may track the number of days over the course of a time period (e.g., month, year, and/or the like) the employee worked for more than a certain quantity of hours. The collector object 160 may also be configured to operate as a comparator by at least providing one or more values that may be used in a logical operation, for example, as threshold values. Here, the collector object 160 may determine, based at least an outcome of the logical operation, whether one or more input values from the first record 150A and/or the second record 150B should be added to the values already accrued by the collector object 160. For example, the collector object 160 may add additional overtime to a quantity of overtime an employee has already accrued if the quantity of overtime the employee has already accrued does not exceed a certain quantity of hours.

In some example embodiments, the valuation engine 110 may perform one or more valuation operations including, for example, determining a total quantity of overtime worked by one or more employee over a time period, identify employees who have worked more than a threshold quantity of overtime during a time period, and/or the like. As noted, the valuation engine 110 may perform at least some complex valuation operations that require deploying the collector object 160 because these complex valuation operations span a different length time period than the records that are being generated and stored in the database 140 (e.g., the first record 150A, the second record 150B, and/or the like). For instance, the valuation engine 110 may be required to determine the total quantity of overtime worked by an employee over a month long period. Alternatively and/or additionally, the valuation engine 110 may be required to determine whether the employee entered more than a threshold quantity of time for a single day. However, the records stored in the database 140 may only capture the times worked by the employee on a weekly basis and may therefore be unable to support valuation operations spanning a day and/or a month.

As such, the collector object 160 may be created by at least defining an object as a time collector object. The collector object 160 may further be associated with a valuation operation such that the valuation operation can be performed using data collected by one or more instances of the collector object 160. For instance, the collector object 160 may be associated with a valuation operation by at least including, in the definition of the valuation operation, a definition of the collector object 160 and/or a link to the collector object 160. Meanwhile, the valuation operation may further be associated with one or more recording profiles, for example, by including, in these recording profiles, the definition of the valuation operation and/or a link to the definition of the valuation operation. It should be appreciated that by including the definition of the valuation operation in a recording profile may enable the valuation engine 110 to perform the valuation operation. Since the valuation operation may require data collected by the collector object 160, the valuation engine 110 may further generate, update, and/or maintain the collector object 160 which, as noted, may be part of the definition of the valuation operation.

Figure 2B:
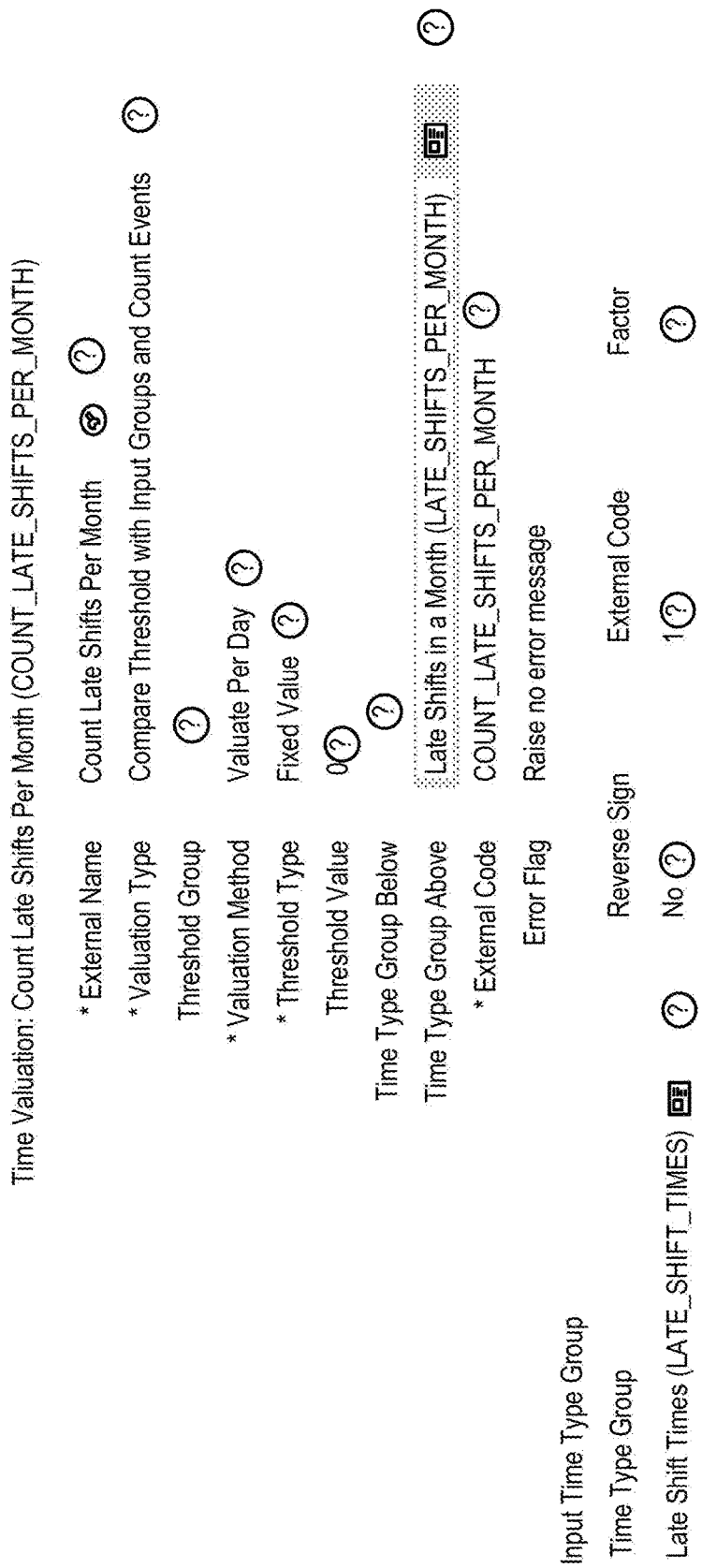
FIG. 2B depicts a screenshot of a user interface, in accordance with some example embodiments.
Figure 2D:
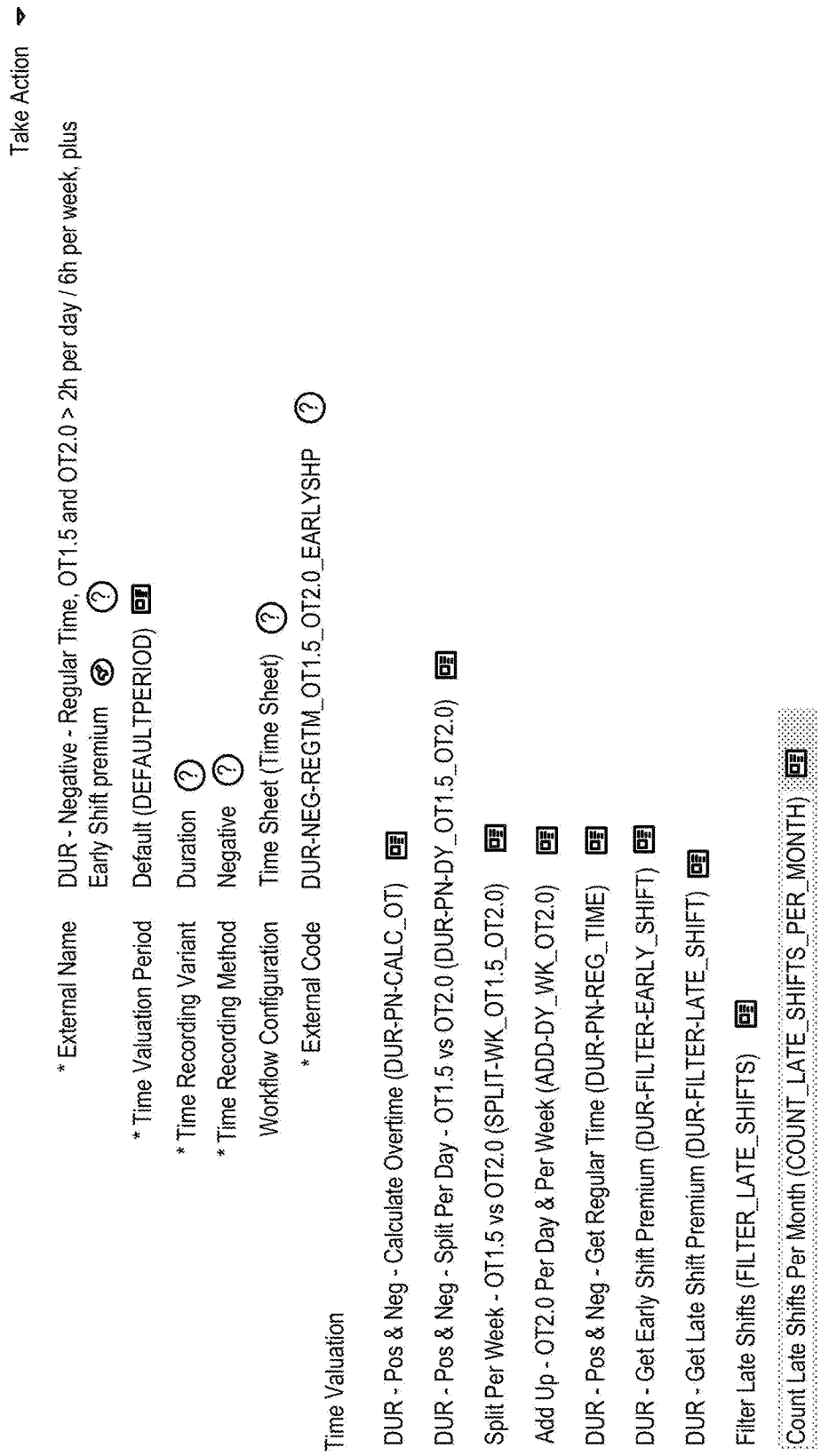
FIG. 2D depicts a screenshot of a user interface, in accordance with some example embodiments.

To further illustrate, FIG. 2B depict a screenshot of a user interface 210 for configuring a valuation operation to count a quantity of late shifts per month. Performing the valuation operation to count the quantity of late shifts per month may require data collected by a collector object configured to serve as a counter that is incremented each time an employee worked a late shift. FIG. 2C depicts a screen shot of a user interface 220 for configuring the collector object to serve as a counter tracking the quantity of late shifts worked by an employee each month. Furthermore, FIG. 2D depicts a screenshot of a user interface 230 for configuring a recording profile that invokes the valuation operation for counting the quantity of late shifts per month. The recording profile may be associated with an employee such that the valuation engine 110 may track values associated with the employee including by performing the valuation operation defined using the user interface 210. For example, the valuation engine 110 may, based on the recording profile defined using the user interface 230, perform the valuation operation to determine the quantity of late shifts worked by the employee each month. In order to perform the valuation operation, the valuation engine 110 may generate, update, and/or maintain the corresponding collector object.

As noted, the collector controller 115 may be configured to generate, update, and/or maintain one or more collector objects including, for example, the collector object 160. Accordingly, in some example embodiments, the collector controller 115 may generate, upon a start of each time period associated with the collector object 160, an instance of the collector object 160 for tracking values that accrue during each time period. Each instance of the collector object 160 may be generated based on the definition of the collector object 160 which, as noted, may be part of a recording profile. For example, if the collector object 160 is configured to collect values over a monthly period, the collector controller 115 may generate an instance of the collector object 160 for each month. Furthermore, the collector controller 115 may update a corresponding instance of the collector object 160 based on one or more records, for example, during the processing of the records. For instance, the collector controller 115 may update, based on the first record 150A and/or the second record 150B, the corresponding instance of the collector object 160 while the first record 150A and/or the second record 150B are pending and/or have been approved but before the first record 150A and/or the second record 150B are stored to the database 140. The instance of the collector object 160 may be stored to the database 140 in a same transaction as the first record 150A and/or the second record 150B. However, in the event that the first record 150A and/or the second record 150B are not successfully stored to the database 140 and/or are otherwise rejected, the collector controller 115 may rollback the update made to the instance of the collector object 160.

To further illustrate, FIG. 2A depicts a user interface 200, in accordance with some example embodiments. The user interface 200 may be display at least some of the values accrued by the collector object 160. In the example shown in FIG. 2, the collector object 160 may be configured to track the quantity of late shifts worked by an employee each month. That is, the collector object 160 may be configured to serve as a counter that is incremented whenever the collector object 160 determines that the employee has worked between certain hours of the day based on, for example, time entries input by the employee each day. These time entries may be stored as part of one or more records (e.g., the first record 150A, the second record 150B, and/or the like), which may be timesheets covering a different length time period (e.g., week) than the collector object 160. As noted, the collector controller 115 may generate an instance of the collector object 160 for each time period (e.g., month) associated with the collector object 160. Moreover, the collector controller 115 may update each instance of the collector object 160 based on the corresponding records. For example, the collector controller 115 may generate a first instance of the collector object 160 for collecting values in the month of May and a second instance of the collector object 160 for collecting values in the month of June. The collector controller 115 may update the first instance of the collector object 160 once for each record (e.g., timesheet) that is created for the month of May. Alternatively and/or additionally, the collector controller 115 may update the second instance of the collector object 160 once for each record (e.g., timesheet) that is created for the month of June.

In some example embodiments, one or more values from a record may be posted to a corresponding instance of the collector object 160, for example, during the processing of the record. For example, the collector controller 115 may post, to an instance of the collector object 160, a first value corresponding to the first record 150A and a second value corresponding to the second record 150B. As such, each instance of the collector object 160 may store the individual values that are posted based on the corresponding records. Alternatively and/or additionally, each instance of the collector object 160 may also store a cumulative value, which may be a sum of the values that have been posted based on the corresponding records. For instance, the collector controller 115 may update, based on the first value corresponding to the first record 150A and/or the second value corresponding to the second record 150B, a cumulative value that is stored in an instance of the collector object 160. It should be appreciated that valuation operations may be performed based on the individual values and/or the cumulative value that is stored as part of an instance of the collector object 160.

In some example embodiments, the collector controller 115 may be configured to recalculate the collector object 160 upon detecting one or more changes to the underlying records such as, for example, the first record 150A, the second record 150B, and/or the like. For example, the collector controller 115 may change one or more of the individual values and/or the cumulative value that is stored as part of an instance of the collector object 160 if any of the underlying records have undergone a change. Referring to FIG. 2A, the collector controller 115 may recalculate the first instance and/or the second instance of the collector object 160 in response to changes to the first record 150A and/or the second record 150B including, for example, changes to one or more of the time entries in the corresponding timesheets. These recalculations may result in an increase and/or decrease in the quantity of late shifts worked by the employee during the month of May and/or the month of June.

In some example embodiments, instances of the collector object 160 may be persisted in the database 140, for example, in order to support revaluations triggered by changes to the underlying records (e.g., the first record 150A, the second record 150B, and/or the like) and/or valuation operations that require data spanning beyond the time period covered by a single instance of the collector object. The collector controller 115 may further remove, from the database 140, instances of the collector object 160 that are not saved to the database 140 as part of a valuation operation. Alternatively and/or additionally, instances of the collector object 160 may also be transient and not persisted in the database 140 if these instances of the collector objects 160 are being used to perform valuation operations that do not require data from multiple instances of the collector object 160. For example, the collector object 160 may be configured to collect values over a monthly period while a valuation operation may span multiple months. In this instance, the first instance of the collector object 160 and the second instance of the collector object 160 to be persisted in the database 140 because each instance of the collector object 160 may include data from only a single month while the valuation operation requires data spanning multiple months. However, if the collector object 160 is configured to collect values over a daily period and the valuation operation merely requires values that are collected over a single day, then the first instance of the collector object 160 and the second instance of the collector object 160 may remain transient.

Figure 3A:
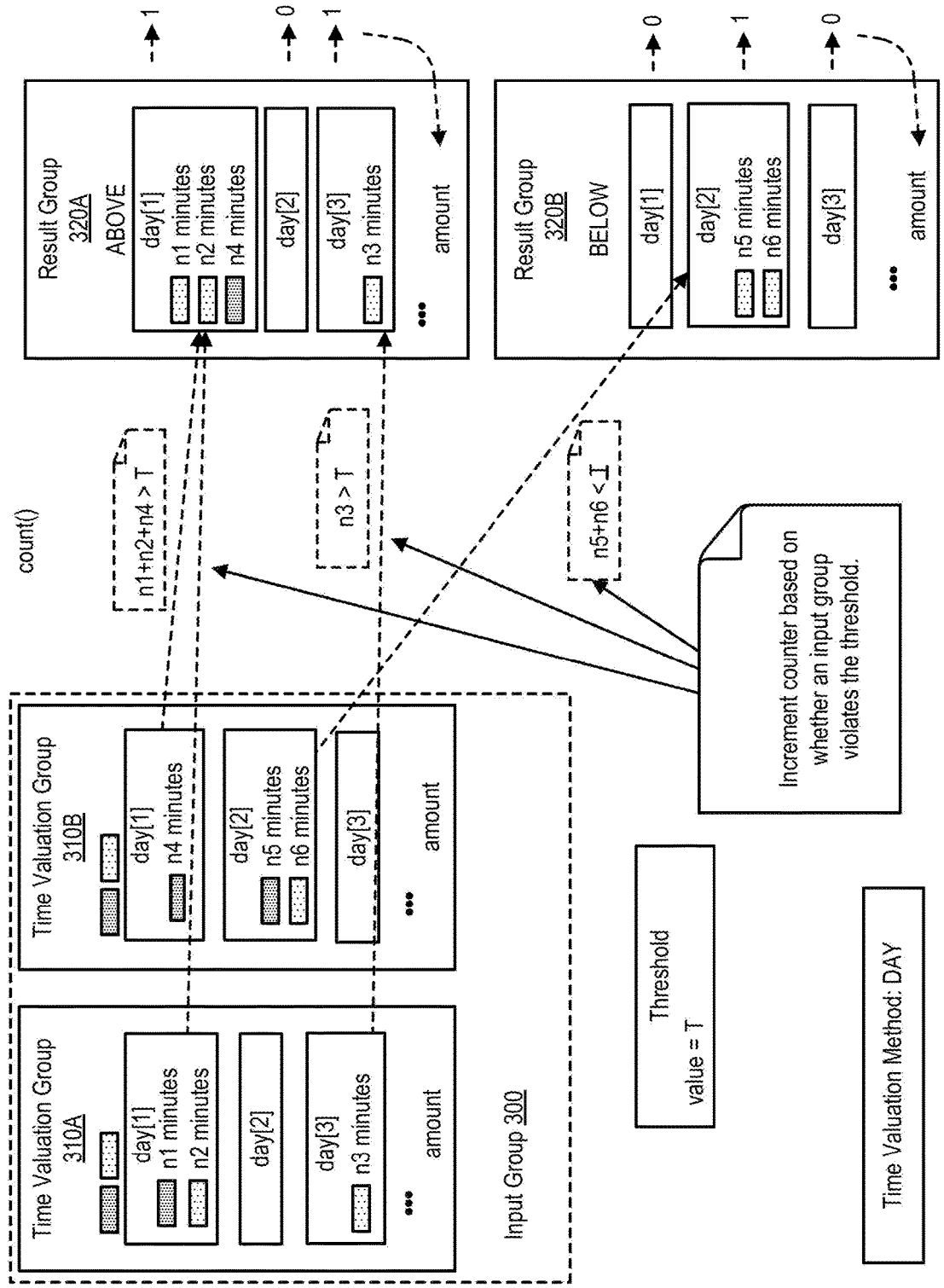
FIG. 3A depicts a counter operation, in accordance with some example embodiments.

FIG. 3A depicts a counter operation, in accordance with some example embodiments. As noted, in some example embodiments, the collector object 160 may be configured to operate as a counter that is incremented based on whether one or more values from an input group 300 that includes a first time valuation group 310A and a second time valuation group 310B. The first time valuation group 310A and the second time valuation group 310B may be different time valuation groups from a single record such as, for example, the first record 150A or the second record 150B. In some example embodiments, the collector object 160 may determine whether a sum of daily values from each of the first time valuation group 310A and the second time valuation group 310B exceed a threshold value T. As shown in FIG. 3A, the collector controller 115 may increment a counter value if a sum of the time accrued on a single day for each of the first time valuation group 310A and the second time valuation group 310B exceeds a threshold value T. For example, FIG. 3A shows a first result group 320A and a second result group 320B. The first result group 320A may store a counter that is incremented whenever the sum of values for a single day from the first time valuation group 310A and the second time valuation group 310B exceed the threshold value T. Alternatively and/or additionally, the second result group 320B may store another counter that is incremented whenever the sum of values for a single day from the first time valuation group 310A and the second time valuation group 310B does not exceed the threshold value T.

Accordingly, as shown in FIG. 3A, the collector controller 115 may, for day[1], increment the counter value associated with the first result group 320A because the sum of the times accrued on day[1] for each of the first time valuation group 310A and the second time valuation group 310B exceed the threshold value T (e.g., $n_1+n_2+n_4>T$). Alternatively and/or additionally, the collector controller 115 may, for day[2], increment the counter value for the second result group 320B because the sum of the times accrued on day[2] for each of the first time valuation group 310A and the second time valuation group 310B does not exceed the threshold value T (e.g., $n_5+n_6 \leq T$).

Figure 3B:
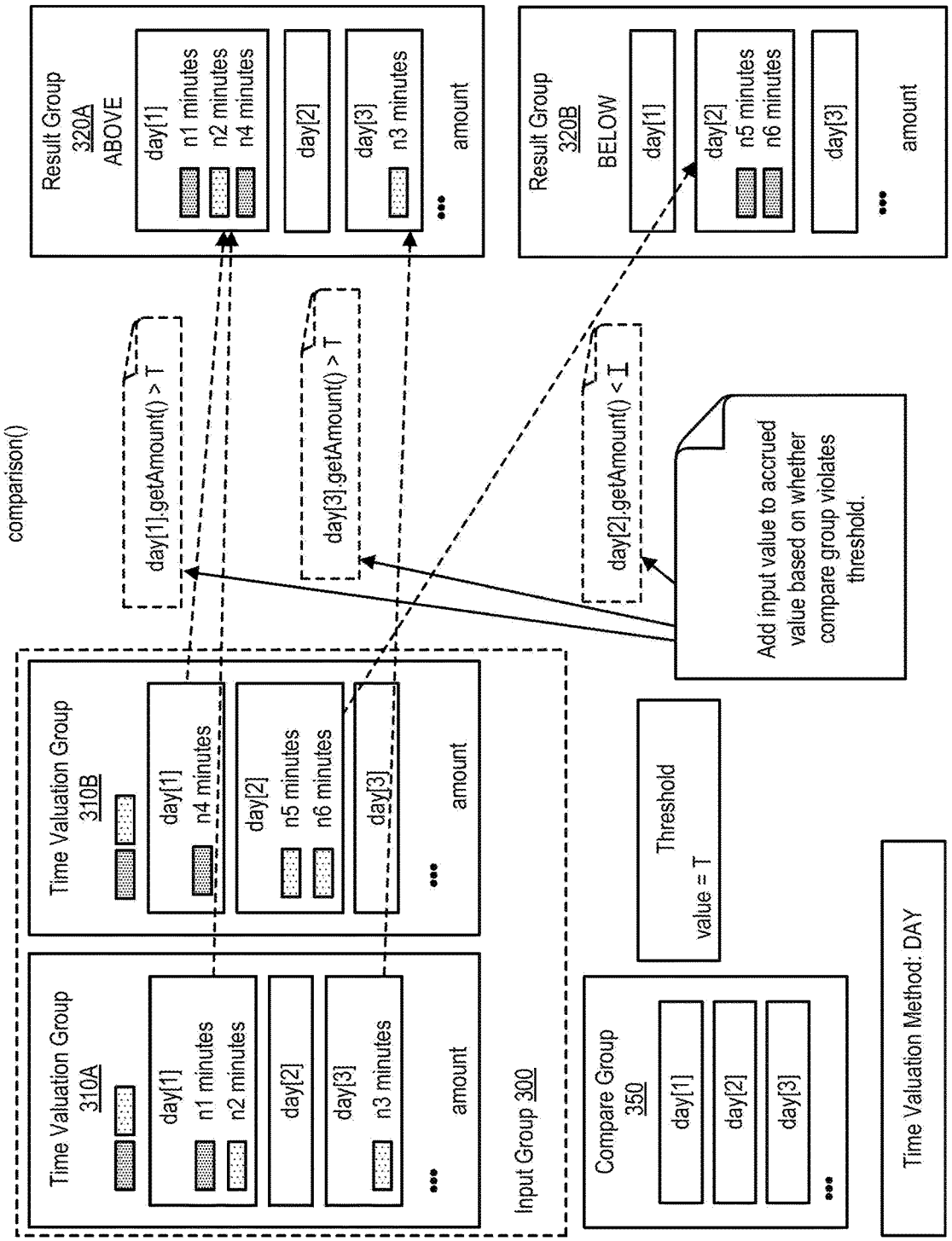
FIG. 3B depicts a comparator operation, in accordance with some example embodiments.

FIG. 3B depicts a comparator operation, in accordance with some example embodiments. In some example embodiments, the collector object 160 may be configured to operate as a comparator by at least providing one or more values that may be used in a logical operation. Accordingly, the collector controller 115 may determine, based on an outcome of the logical operation, whether one or more input values should be added to the values are being accrued. As shown in FIG. 3B, the collector controller 115 may generate, based on the first time valuation group 310A and/or the second time valuation group 310B from the input group 300, a compare group 350. The compare group 350 may store one or more intermediate values determined based on daily values from the input group 300 including, for example, the first time valuation group 310A and/or the second time valuation group 310B. These intermediate values may be used in a logical operation, for example, by being compared to a threshold value T. Moreover, the result of the logical operation may determine whether a sum of values from the first time valuation group 310A and/or the second time valuation group 310B should be added to the first result group 320A or the second result group 320B.

For instance, the compare group 350 may include an intermediate value day[1] determined based on values the associated with day[1] from each of the first time valuation group 310A and the second time valuation group 310B (e.g., $n_1$, $n_2$, and $n_4$). Similarly, the compare group 350 may include another intermediate value day[2], corresponding to the values associated with day[2] from each of the first time valuation group 310A and the second time valuation group 310B (e.g., $n_5$ and $n_6$). The collector controller 115 may add the values for day[1] and day[2] from the input group 300 to the values already accrued in the first result group 320A or the second result group 320B based on whether the intermediate values in the compare group 350 exceed the threshold value T. For example, the collector controller 115 may add the values $n_1$, $n_2$, and $n_4$ to the values already accrued and stored in in the first result group 320A based on the intermediate value for day[1] exceeding the threshold value T. Alternatively and/or additionally, the collector controller 115 may add the values $n_5$ and $n_6$ to the values already accrued and stored in the second result group 320B based on the intermediate value for day[1] not exceeding the threshold value T.

Figure 4:
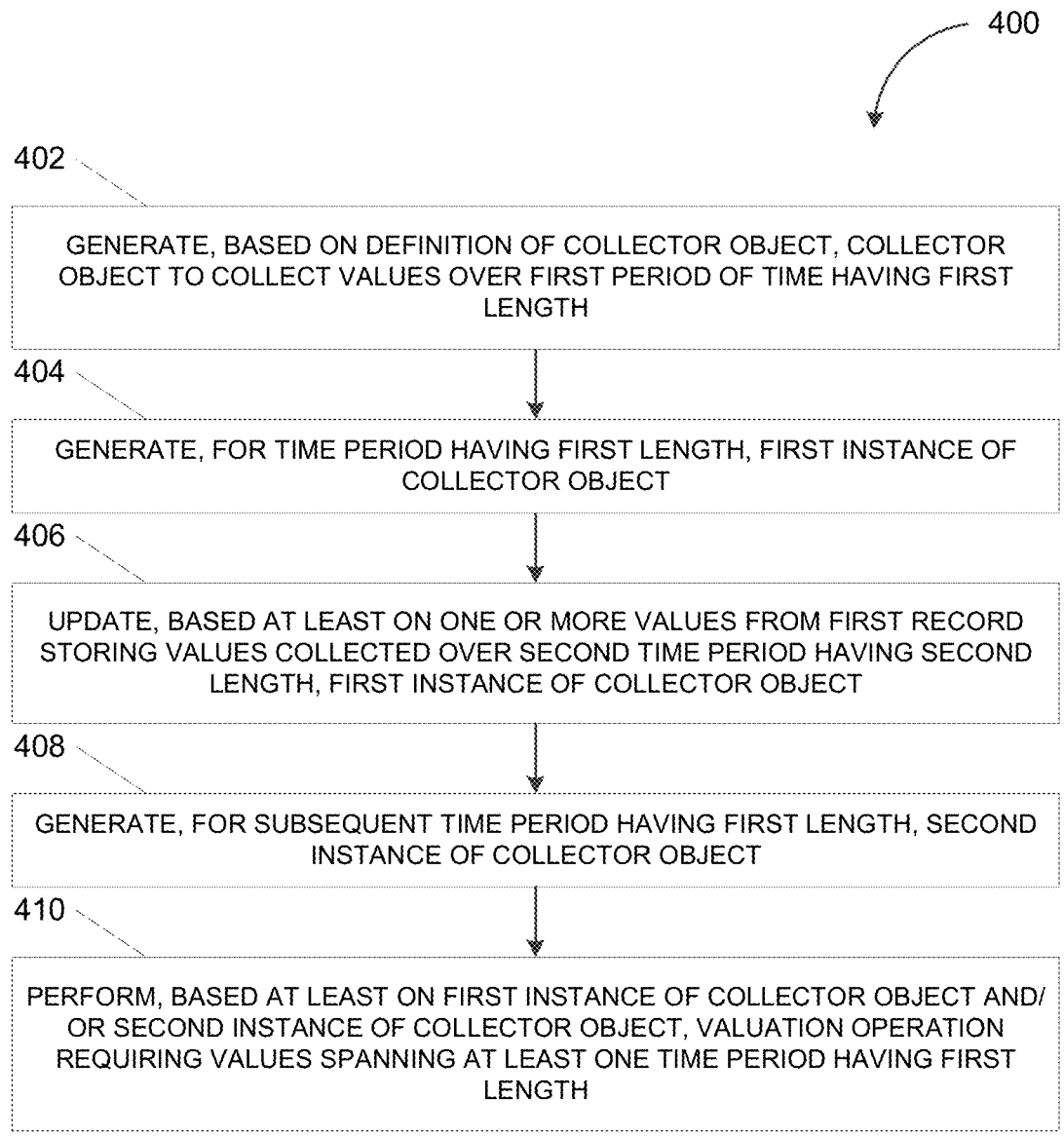
FIG. 4 depicts a flowchart illustrating a process for tracking a value based on a collector object, in accordance with some example embodiments.

FIG. 4 depicts a flowchart illustrating a process 400 for tracking a value based on a collector object, in accordance with some example embodiments. Referring to FIGS. 1-2, 3A-B, and 4, the process 400 may be performed by the valuation engine 110 in order to perform a valuation operation that spans a different length time period than one or more records (e.g., the first record 150A, the second record 150B, and/or the like) that are generated and stored in the database 140.

At 402, the valuation engine 110 may generate, based on a definition of the collector object 160, the collector object 160 to collect values over a first time period having a first length. For instance, as shown in FIGS. 2B-D, to enable the performance of a valuation operation that requires data collected by the collector object 160, the definition of the valuation operation may include a definition for the collector object 160 and/or a link to the collector object 160. Furthermore, the valuation operation may be part of a definition of one or more recording profiles, thereby associating the valuation operation with these recording profiles. As such, the valuation engine 110 may perform, based on a recording profile, the valuation operations that are associated with the recording profile. The performance of the valuation operations may include generating, updating, and/or maintaining, based on the definition of the collector object 160, one or more instances of the collector object 160 to at least enable the performance of the valuation operation.

At 404, the valuation engine 110 may generate, for a time period having the first length, a first instance of the collector object 160. In some example embodiments, valuation engine 110, for example, the collector controller 115 may generate, for each time period, an instance of the collector object 160. Each instance of the collector object 160 may be configured to track values that accrue during a corresponding time period. For example, where the collector object 160 is configured to track values that accrue on a monthly basis, the collector controller 115 may generate an instance of the collector object 160 for each month. Referring again to FIG. 2A, the collector controller 115 may generate a first instance of the collector object 160 for the month of May.

At 406, the valuation engine 110 may update, based at least on one or more values from a first record storing values collected over a second time period having a second length, the first instance of the collector object 160. In some example embodiments, the valuation engine 110, for example, the collector controller 115 may update an instance of the collector object 160 based at least on values from the corresponding records. For example, if the first instance of the collector object 160 tracks values that accrue during the month of May, the collector controller 115 may update the first instance of the collector controller 160 for each record that is generated for the month of May. As noted, each record that is generated for the month of May may be a timesheet storing time entries entered by an employee over the course of a single week. Accordingly, the collector controller 115 may create, for each week in the month of May, an update to the first instance of the collector controller 160. For instance, the collector controller 115 may update the first instance of the collector object 160 by posting, to the first instance of the collector object 160, one or more individual values corresponding to values from each individual timesheet. Alternatively and/or additionally, the collector controller 115 may update the first instance of the collector object 160 by at least updating a cumulative value, which may correspond to a sum of individual values posted to the first instance of the collector object 160.

At 408, the valuation engine 110 may generate, for a subsequent time period having the first length, a second instance of the collector object 160. As noted, the valuation engine 110, for example, the collector controller 115 may generate, for each time period, a separate instance of the collector object 160. Accordingly, subsequent to generating and updating the first instance of the collector object 160 for the month of May, the collector controller 115 may generate a second instance of the collector object 160 for the next month of June. It should be appreciated that the collector controller 115 may also update the second instance of the collector object 160 based on values stored in the corresponding records. For example, as shown in FIG. 2A, the collector controller 115 may update the second instance of the collector object 160 based on the records (e.g., timesheets) that are generated for the month of June including by posting one or more individual values to the second instance of the collector object 160 and/or updating a cumulative value corresponding to a sum of the individual values posted to the second instance of the collector object 360.

At 410, the valuation engine 110 may perform, based at least on the first instance of the collector object 160 and/or the second instance of the collector object 160, a valuation operation requiring values spanning at least one time period having the first length. In some example embodiments, the valuation engine 110 may be configured to perform a valuation operation that spans a different length time period than the records that are generated and stored in the database 140 (e.g., the first record 150A, the second record 150B, and/or the like). For instance, the first record 150A may be a timesheet storing time entries from Week A and the second record 150B may be another timesheet storing time entries from Week B. Meanwhile, the valuation engine 110 may be required to perform a valuation operation that spans a different length time period. For example, the valuation engine 110 may be required to determine the total quantity of overtime worked by an employee over a month long period. Alternatively and/or additionally, the valuation engine 110 may be required to determine whether the employee entered more than a threshold quantity of time for a single day. The valuation engine may perform these valuation operations, which span a different length time period that the first record 150A and/or the second record 150B, based on instances of the collector object 160.

Figure 5:
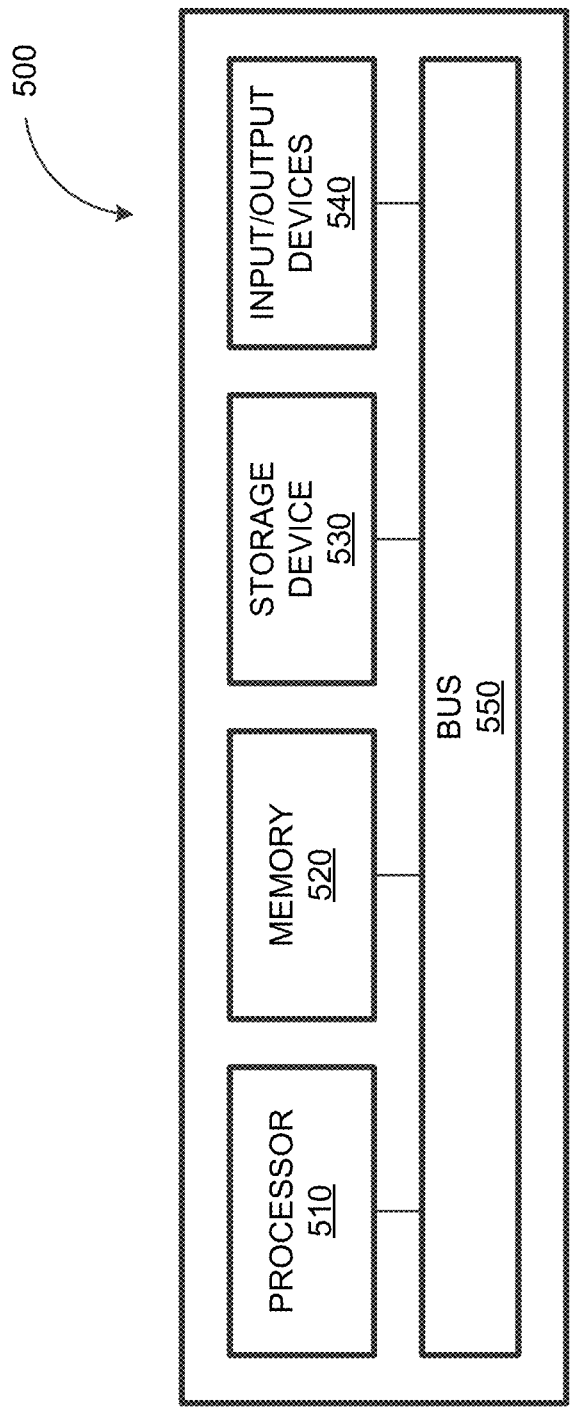
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the valuation engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the valuation engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        receiving, from a client, a first definition of a valuation operation that requires values spanning at least one time period having a first length, the first definition of the valuation operation including a second definition of a collector object associated with the at least one time period having the first length;
        generating, based at least on the second definition of the collector object, a first instance of the collector object collecting a first plurality of values associated with a first time period having the first length;
        generating, based at least on the second definition of the collector object, a second instance of the collector object collecting a second plurality of values associated with a second time period having the first length;
        updating, based at least on a first record storing a third plurality of values associated with a third time period having a second length, the first instance of the collector object and the second instance of the collector object; and
        performing, based at least on the first definition of the valuation operation, the valuation operation using the first instance of the collector object and the second instance of the collector object.

2. The system of claim 1, wherein the first instance of the collector object and the second instance of the collector object are updated based at least on one or more of the third plurality of values exceeding a threshold value.

3. The system of claim 1, wherein the first instance of the collector object and the second instance of the collector object are updated based at least on an outcome of a logical expression applied to one or more of the third plurality of values.

4. The system of claim 1, wherein the updating of the first instance of the collector object and the second instance of the collector object comprises storing, in each of the first instance of the collector object and the second instance of the collector object, at least one value corresponding to one or more of the third plurality of values from the first record.

5. The system of claim 4, wherein the updating of the first instance of the collector object and the second instance of the collector object further comprises updating, based on one or more of the third plurality of values from the first record, a cumulative value stored in the first instance of the collector object or the second instance of the collector object, and wherein the cumulative value corresponds to a quantity accrued over the first time period.

6. The system of claim 1, further comprising:
    updating, based at least on one or more values from a second record, the first instance of the collector object and/or the second instance of the collector object, the second record being configured to collect values over a fourth time period having the second length.

7. The system of claim 1, further comprising:
    storing, in a database, the first record;
    in response to the first record being successfully stored in the database, storing, in the database, the first instance of the collector object and the second instance of the collector object updated based on the first record; and
    in response to the first record not being successfully stored in the database, undo the update made to the first instance of the collector object and the second instance of the collector object.

8. The system of claim 7, further comprising:
    in response to detecting one or more changes to the first record stored in the database, updating, based at least on the one or more changes to the first record, the first instance of the collector object and/or the second instance of the collector object stored in the database.

9. The system of claim 1,
    wherein the valuation operation is performed without persisting, in a database, the first instance of the collector object and/or the second instance of the collector object.

10. The system of claim 1, wherein the first record comprises a timesheet storing time entries input over the second time period.

11. A computer-implemented method, comprising:
    receiving, from a client, a first definition of a valuation operation that requires values spanning at least one time period having a first length, the first definition of the valuation operation including a second definition of a collector object associated with the at least one time period having the first length;
    generating, based at least on the second definition of the collector object, a first instance of the collector object collecting a first plurality of values associated with a first time period having the first length;

generating, based at least on the second definition of the collector object, a second instance of the collector object collecting a second plurality of values associated with a second time period having the first length;

updating, based at least on a first record storing a third plurality of values associated with a third time period having a second length, the first instance of the collector object and the second instance of the collector object; and performing, based at least on the first definition of the valuation operation, the valuation operation using the first instance of the collector object and the second instance of the collector object.

12. The method of claim 11, wherein the first instance of the collector object and the second instance of the collector object are updated based at least on one or more of the third plurality of values exceeding a threshold value.

13. The method of claim 11, wherein the first instance of the collector object and the second instance of the collector object are updated based at least on an outcome of a logical expression applied to one or more of the third plurality of values.

14. The method of claim 11, wherein the updating of the first instance of the collector object and the second instance of the collector object comprises storing, in each of the first instance of the collector object and the second instance of the collector object, at least one value corresponding to one or more of the third plurality of values from the first record.

15. The method of claim 14, wherein the updating of the first instance of the collector object and the second instance of the collector object further comprises updating, based on one or more of the third plurality of values from the first record, a cumulative value stored in the first instance of the collector object or the second instance of the collector object, and wherein the cumulative value corresponds to a quantity accrued over the first time period.

16. The method of claim 11, further comprising:
updating, based at least on one or more values from a second record, the first instance of the collector object and/or the second instance of the collector object, the second record being configured to collect values over a fourth time period having the second length.

17. The method of claim 11, further comprising:
storing, in a database, the first record;

in response to the first record being successfully stored in the database, storing, in the database, the first instance of the collector object and the second instance of the collector object updated based on the first record; and in response to the first record not being successfully stored in the database, undo the update made to the first instance of the collector object and the second instance of the collector object.

18. The method of claim 17, further comprising:
in response to detecting one or more changes to the first record stored in the database, updating, based at least on the one or more changes to the first record, the first instance of the collector object and/or the second instance of the collector object stored in the database.

19. The method of claim 11,
wherein the valuation operation is performed without persisting, in a database, the first instance of the collector object and/or the second instance of the collector object.

20. A non-transitory computer readable medium storing instructions, which when executed by at least one data processor, result in operations comprising:

receiving, from a client, a first definition of a valuation operation that requires values spanning at least one time period having a first length, the first definition of the valuation operation including a second definition of a collector object associated with the at least one time period having the first length;

generating, based at least on the second definition of the collector object, a first instance of the collector object collecting a first plurality of values associated with a first time period having the first length;

generating, based at least on the second definition of the collector object, a second instance of the collector object collecting a second plurality of values associated with a second time period having the first length;

updating, based at least on a first record storing a third plurality of values associated with a third time period having a second length, the first instance of the collector object and the second instance of the collector object; and performing, based at least on the first definition of the valuation operation, the valuation operation using the first instance of the collector object and the second instance of the collector object.

\* \* \* \* \*